(12) United States Patent
Marinier et al.

(10) Patent No.: US 8,259,580 B2
(45) Date of Patent: Sep. 4, 2012

(54) METHOD AND APPARATUS FOR SETTING A HAPPY BIT ON AN E-DCH DEDICATED PHYSICAL CONTROL CHANNEL

(75) Inventors: Paul Marinier, Brossard (CA); Diana Pani, Montreal (CA); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 500 days.

(21) Appl. No.: 12/487,370

(22) Filed: Jun. 18, 2009

(65) Prior Publication Data

US 2009/0316639 A1    Dec. 24, 2009

Related U.S. Application Data

(60) Provisional application No. 61/074,212, filed on Jun. 20, 2008, provisional application No. 61/089,277, filed on Aug. 15, 2008.

(51) Int. Cl.
*G01R 31/08* (2006.01)
*G08C 17/00* (2006.01)

(52) U.S. Cl. ........................ 370/235; 370/311
(58) Field of Classification Search .......... None
See application file for complete search history.

(56) References Cited

U.S. PATENT DOCUMENTS

| 8,059,682 | B2* | 11/2011 | Sebire et al. | 370/470 |
| 2006/0268884 | A1* | 11/2006 | Terry et al. | 370/394 |
| 2007/0073895 | A1* | 3/2007 | Sebire et al. | 709/230 |
| 2008/0080381 | A1* | 4/2008 | Maheshwari et al. | 370/235 |

OTHER PUBLICATIONS

Interdigital, "Happy bit Setting With Improved L2 UL", Change Request, 25.321, Current Version 8.1.0, 3GPP TSG-WG2 Meeting #62bis, R2-08xxxx, (Warsaw, Poland, Jun. 30-Jul. 4, 2008).
Third Generation Partnership Project, "Technical Specification Group Radio Access Network; Physical Layer—Measurements (FDD) (Release 8)", 3GPP TS 25.215 V8.0.0, (Mar. 2008).
Third Generation Partnership Project, "Technical Specification Group Radio Access Network; Physical Layer—Measurements (FDD) (Release 8)", 3GPP TS 25.215 V8.2.0, (Sep. 2008).
Third Generation Partnership Project, "Technical Specification Group Radio Access Network; Physical Layer—Measurements (FDD) (Release 8)", 3GPP TS 25.215 V8.3.0, Mar. 2009).

(Continued)

*Primary Examiner* — Marcus R Smith
*Assistant Examiner* — Eunsook Choi
(74) *Attorney, Agent, or Firm* — Condo Roccia LLP

(57) ABSTRACT

A wireless transmit/receive unit (WTRU) determines (1) whether the WTRU is transmitting as much scheduled data as allowed by a current Serving_Grant, (2) whether the WTRU has enough power to transmit at higher data rate, and (3) based on a same power offset as a currently selected E-DCH transport format combination (E-TFC), whether total E-DCH buffer status (TEBS) would require more than predetermined period to be transmitted with the current Serving_Grant×a ratio of active processes to a total number of processes. If criteria (1)-(3) are met, the WTRU sets the happy bit to "unhappy." If MAC-i/is is configured, the WTRU evaluates criteria (2) by identifying an E-TFC that has a transport block size at least x bits larger than a transport block size of the currently selected E-TFC, and determining whether the identified E-TFC is supported based on a same power offset as the currently selected E-TFC.

12 Claims, 6 Drawing Sheets

OTHER PUBLICATIONS

Third Generation Partnership Project, "Technical Specification Group Radio Access Network; Medium Access Control (MAC) Protocol Specification (Release 8)," 3GPP TS 25.321 v8.1.0, (Mar. 2008).

Third Generation Partnership Project, "Technical Specification Group Radio Access Network; Medium Access Control (MAC) Protocol Specification (Release 8)," 3GPP TS 25.321 v8.2.0, (May 2008).

Third Generation Partnership Project, "Technical Specification Group Radio Access Network; Medium Access Control (MAC) Protocol Specification (Release 8)," 3GPP TS 25.321 v8.4.0, (Dec. 2008).

Third Generation Partnership Project, "Technical Specification Group Radio Access Network; Medium Access Control (MAC) Protocol Specification (Release 8)," 3GPP TS 25.321 v8.5.0, (Mar. 2009).

InterDigital, "Happy Bit Setting with Improved L2 for UL", R2-083374, 3GPP TSG-RAN WG2 Meeting #62bis, Warsaw, Poland, Jun. 30-Jul. 4, 2008, 2 pages.

InterDigital, "Happy Bit Setting with Improved L2 for UL", R2-084137, 3GPP TSG-RAN WG2 Meeting #63, Jeju, South Korea, Aug. 18-22, 2008, 4 pages.

Lge et al., "R2-052358 Criteria for the Happy Bit", R2-052358, 3GPP TSG-RAN WG2 Meeting #48bis, Cannes, France, Oct. 10-14, 2005, 1-4.

Nokia Corporation, Nokia Siemens Networks, Enhanced Uplink for CELL_FACH in 25.321, R2-081774, 3GPP TSG-RAN WG2 Meeting #61, Shenzhen, China, Mar. 31-Apr. 4, 2008, 156 pages.

* cited by examiner

METHOD AND APPARATUS FOR SETTING A HAPPY BIT ON AN E-DCH DEDICATED PHYSICAL CONTROL CHANNEL

CROSS REFERENCE TO RELATED APPLICATIONS

This application claims the benefit of U.S. Provisional Application Nos. 61/074,212 filed Jun. 20, 2008 and 61/089,277 filed Aug. 15, 2008, which are incorporated by reference as if fully set forth.

FIELD OF INVENTION

This application is related to wireless communications.

BACKGROUND

The third generation partnership project (3GPP) high speed uplink packet access (HSUPA) employs a mechanism known as "happy bit" to allow a wireless transmit/receive unit (WTRU) to indicate to the network whether the uplink data rate allocated to the WTRU is sufficient or not given the amount of data in the WTRU buffer. The happy bit is included in an enhanced dedicated channel (E-DCH) dedicated physical control channel (E-DPCCH) for every E-DCH transmissions.

A radio resource control (RRC) entity configures a medium access control (MAC) entity with the duration Happy_Bit_Delay_Condition. The WTRU evaluates the current grant relative to the total E-DCH buffer status (TEBS) during this duration after application of an E-DCH transport format combination (E-TFC) selection. In accordance with the 3GPP specification 25.321 V8.2.0, for every E-DCH transmission, the happy bit is set to "unhappy" if the following three criteria are met:

(1) The WTRU is transmitting as much scheduled data as allowed by the current Serving_Grant in E-TFC selection;

(2) The WTRU has enough power available to transmit at a higher data rate; and (3) Based on the same power offset as the one selected in E-TFC selection to transmit data in the same transmission time interval (TTI) as the happy bit, TEBS would require more than Happy_Bit_Delay_Condition ms to be transmitted with the current Serving_Grant×the ratio of active processes to the total number of processes.

If the above three criteria are not met, the happy bit shall be set to "happy." The received happy bit may be used by the network to determine whether the serving grant should be increased, decreased, or left unchanged.

In accordance with the 3GPP specification, the WTRU will only set the happy bit to "unhappy" if the WTRU has sufficient transmission power to include at least one additional radio link control (RLC) protocol data unit (PDU) in an E-TFC. In other words, the WTRU sets the happy bit to "unhappy" only if there is an E-TFC that may accommodate one additional RLC PDU compared to the one used when the happy bit is determined and the E-TFC is in a "supported state." This restriction has been introduced to prevent the WTRU from requesting a higher data rate from the network while the WTRU would anyway be unable to increase its data rate due to power restrictions.

With the introduction of flexible RLC PDU size and segmentation at the MAC layer for the HSUPA in 3GPP Release 8, restriction that the WTRU has to be capable of transmitting at least one additional RLC PDU in an E-TFC is needlessly restrictive because the WTRU may increase the data rate by transmitting a segment of an additional RLC PDU or just increase the size of the RLC PDU. With this restriction the WTRU will not set the happy bit to "unhappy" even though the WTRU can increase the data rate by transmitting a fraction of an additional RLC PDU or by increasing the size of subsequent RLC PDUs. Thus, under the conventional 3GPP specification, the uplink data rate is not maximized.

Under the current 3GPP specification, if the serving grant becomes too small to allow transmission of a single PDU from any scheduled MAC-d flow or if the serving grant is too small to allow transmission of a single PDU from any scheduled MAC-d flow and TEBS becomes larger than zero, the transmission of scheduling information is triggered. With the introduction of MAC segmentation for the HSUPA, it is unlikely that the WTRU is unable to transmit any data when the serving grant falls below a certain value because with the introduction of MAC segmentation the WTRU may always be able to transmit a segment of an RLC PDU even if the grant is too small to allow the transmission of a full RLC PDU. Therefore, the above scheduling information triggering criterion is not desirable and may result in excessive transmission of the scheduling information.

SUMMARY

A method and an apparatus for setting a happy bit on an E-DPCCH are disclosed. A WTRU determines (1) whether the WTRU is transmitting as much scheduled data as allowed by a current Serving_Grant in E-TFC selection, (2) whether the WTRU has enough power available to transmit at a higher data rate, and (3) based on a same power offset as a currently selected E-TFC for transmission in a same TTI as the happy bit, whether TEBS would require more than Happy_Bit_Delay_Condition ms to be transmitted with the current Serving_Grant x a ratio of active processes to a total number of processes. On a condition that the criteria (1) through (3) are met, the WTRU sets the happy bit to "unhappy." On a condition that a medium access control entity for E-DCH (MAC-i/is) is configured, the WTRU evaluates the criteria (2) by identifying an E-TFC that has a transport block size at least x bits larger than a transport block size of the currently selected E-TFC, and determining whether the identified E-TFC is supported based on a same power offset as the currently selected E-TFC. The value x may be a predetermined value or may be configured by a higher layer.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

For every E-DCH transmission, a WTRU sets a happy bit to "unhappy" if the three criteria are met, (i.e., (1) the WTRU is transmitting as much scheduled data as allowed by the current Serving_Grant in E-TFC selection, (2) the WTRU has enough power available to transmit at a higher data rate; and (3) based on the same power offset as the one selected in E-TFC selection to transmit data in the same TTI as the happy bit, TEBS would require more than Happy_Bit_Delay_Condition ms to be transmitted with the current Serving_Grant×the ratio of active processes to the total number of processes).

Figure 1:
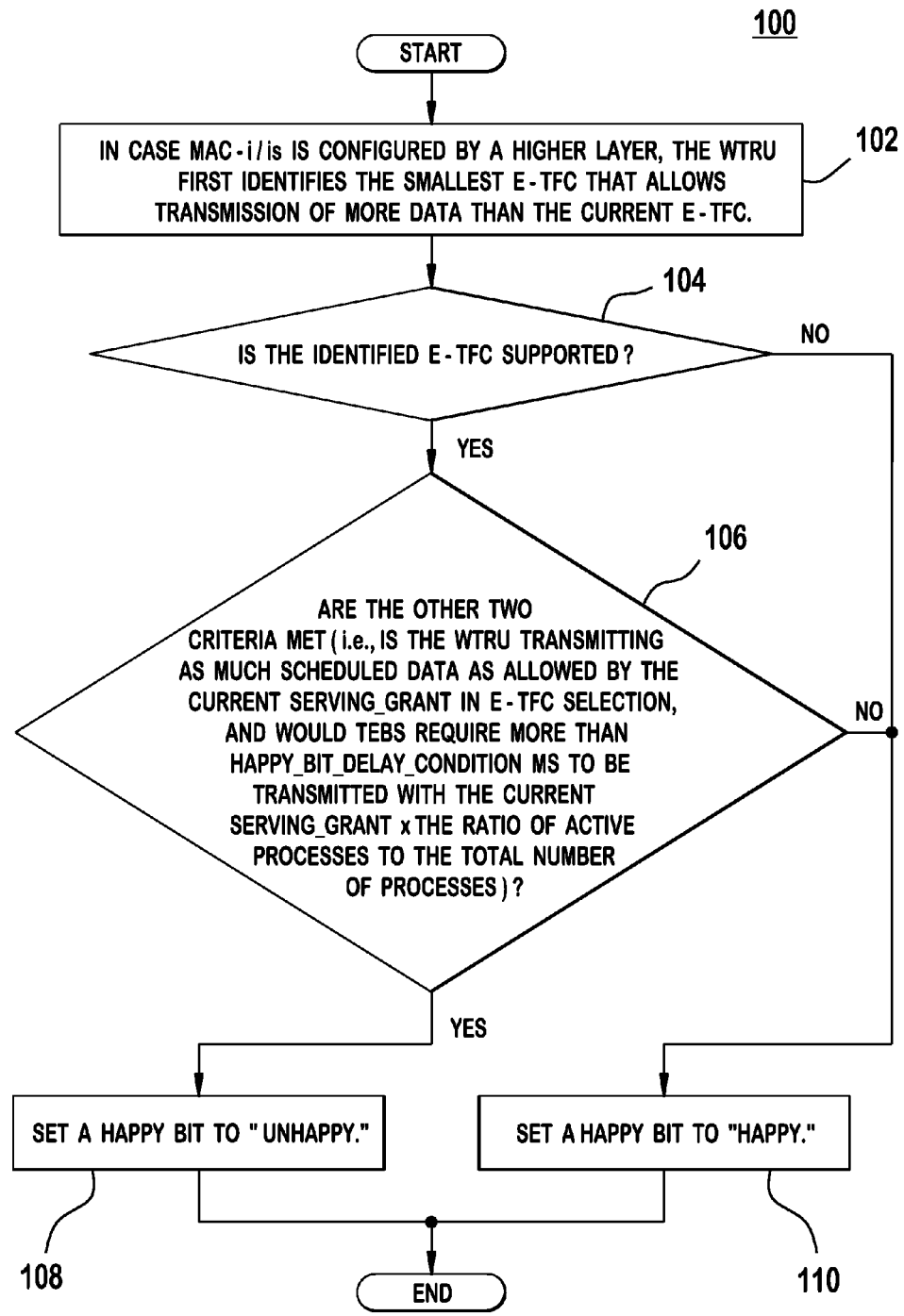
FIG. 1 is a flow diagram of an example process for determining whether a WTRU has enough power available to transmit at a higher data rate and setting a happy bit in accordance with a first embodiment.

FIG. 1 is a flow diagram of an example process 100 for determining whether a WTRU has enough power available to transmit at a higher data rate and setting a happy bit in accordance with a first embodiment. In case MAC-i/is (MAC entity for handling E-DCH transmissions which supports MAC segmentation) is configured by a higher layer, (i.e., RLC PDU segmentation at the MAC layer is supported), a WTRU identifies a smallest E-TFC that allows transmission of more data than the current E-TFC (step 102). The current E-TFC is the E-TFC selected for transmission in the same TTI as the happy bit whose value is to be determined. The additional data may be from any logical channel that does not belong to a non-scheduled MAC-d flow. The WTRU then determines, based on the same power offset as the current E-TFC, whether the identified E-TFC is supported, (i.e., whether the identified E-TFC may be transmitted considering the maximum allowed power of the WTRU), (step 104). If the identified E-TFC is supported, the WTRU determines that the WTRU has enough power available to transmit at a higher data rate. The WTRU determines whether the other two criteria, (criteria (1) and (3)), are met (step 106). If so, the WTRU sets the happy bit to "unhappy" (step 108). If the identified E-TFC is not supported, or if the other two criteria are not met, the WTRU sets the happy bit to "happy" (step 110).

It should be noted that the method steps in FIG. 1 may be performed in different order. For example, step 106 may be performed before step 102.

Figure 2:
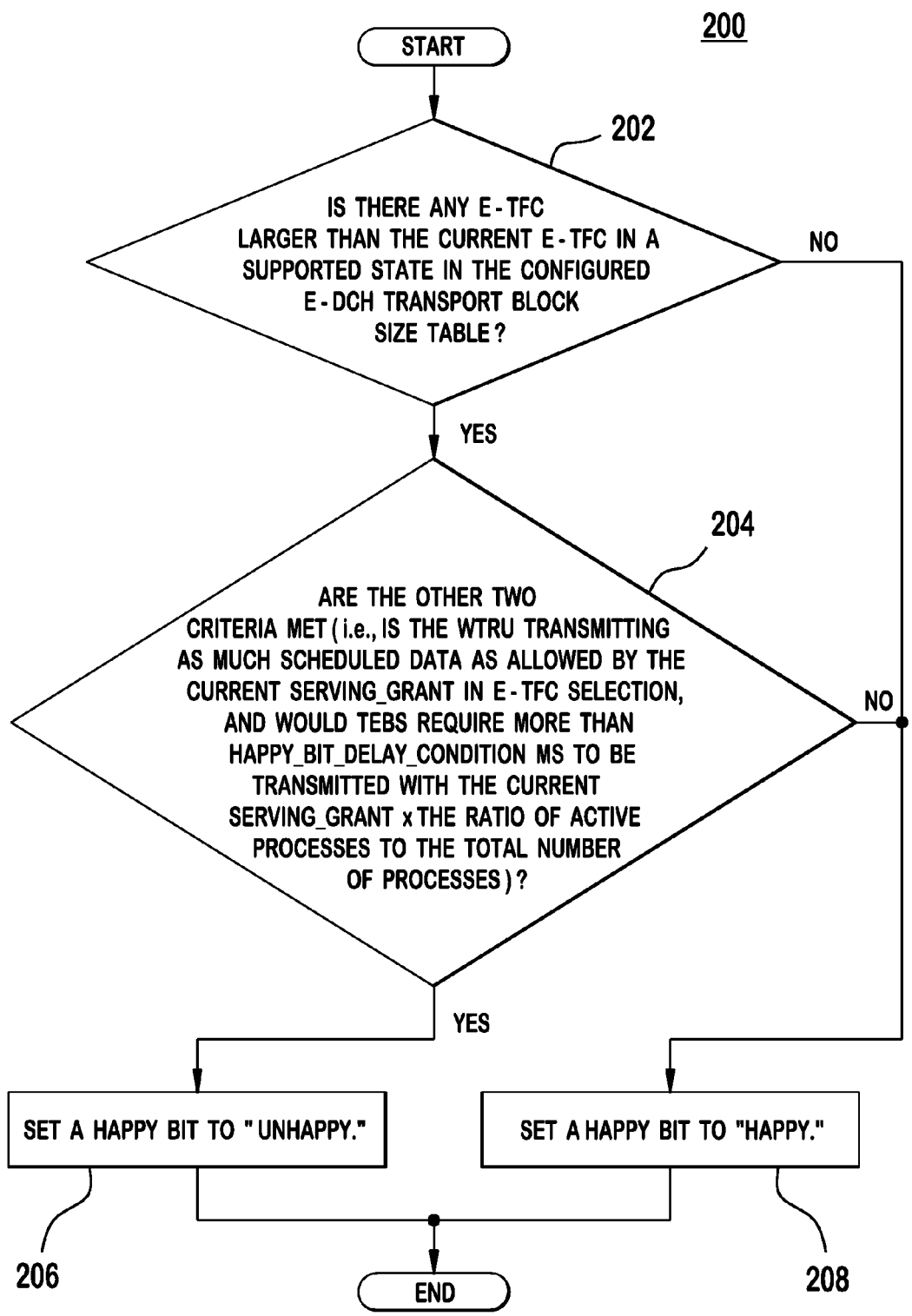
FIG. 2 is a flow diagram of an example process for determining whether a WTRU has enough power available to transmit at a higher data rate and setting a happy bit in accordance with a second embodiment.

FIG. 2 is a flow diagram of an example process 200 for determining whether a WTRU has enough power available to transmit at a higher data rate and setting a happy bit in accordance with a second embodiment. In case MAC-i/is is configured by a higher layer, a WTRU determines if there is any E-TFC larger than the current E-TFC in a supported state in the configured E-DCH transport block size table (step 202). The current E-TFC is the E-TFC selected for transmission in the same TTI as the happy bit whose value is to be determined. If there is any E-TFC larger than the current E-TFC in a supported state in the configured E-DCH transport block size table, the WTRU determines that the WTRU has enough power available to transmit at a higher data rate. The WTRU determines whether the other two criteria, (i.e., criteria (1) and (3)), are met (step 204). If so, the WTRU sets the happy bit to "unhappy" (step 206). If there is no E-TFC larger than the current E-TFC in a supported state in the configured E-DCH transport block size table, or if the other two criteria are not met, the WTRU sets the happy bit to "happy" (step 208).

It should be noted that the method steps in FIG. 2 may be performed in different order. For example, step 204 may be performed before step 202.

Figure 3:
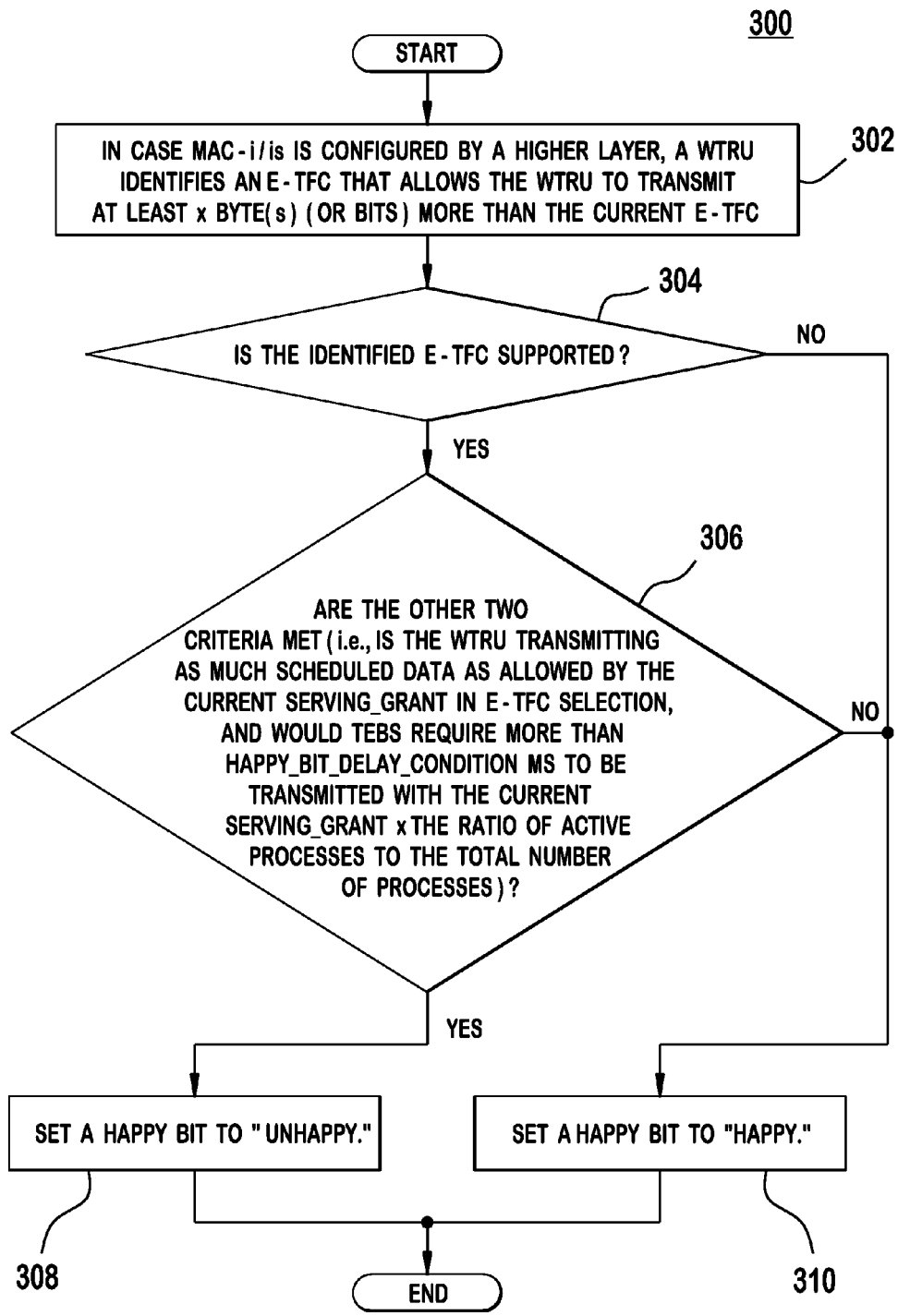
FIG. 3 is a flow diagram of an example process for determining whether a WTRU has enough power available to transmit at a higher data rate and setting a happy bit in accordance with a third embodiment.

FIG. 3 is a flow diagram of an example process 300 for determining whether a WTRU has enough power available to transmit at a higher data rate and setting a happy bit in accordance with a third embodiment. In case MAC-i/is is configured by a higher layer, a WTRU identifies an E-TFC that allows the WTRU to transmit at least x byte(s) (or bits) more than the current E-TFC (step 302). The current E-TFC is the E-TFC selected for transmission in the same TTI as the happy bit whose value is to be determined. The additional data may be from any logical channel that does not belong to a non-scheduled MAC-d flow. Optionally, the WTRU may take into account the possible need for additional MAC overhead in calculating the additional data, (e.g., if the additional data would have to come from a different RLC PDU than the last segmented one).

The WTRU then determines, based on the same power offset as the current E-TFC, whether the identified E-TFC is supported (step 304). If the identified E-TFC is supported, the WTRU determines that the WTRU has enough power available to transmit at a higher data rate. The WTRU determines whether the other two criteria, (i.e., criteria (1) and (3)), are met (step 306). If so, the WTRU sets the happy bit to "unhappy" (step 308). If the identified E-TFC is not supported, or if the other two criteria are not met, the WTRU sets the happy bit to "happy" (step 310).

The value x may be a fixed pre-determined value, (e.g., 1). The value x may be signaled by a higher layer. The value x may correspond to a "minimum MAC segment size" if such parameter is defined. The value x may correspond to the minimum RLC PDU size or a function thereof. The value x may correspond to a percentage increase in the size of the current RLC PDU size, (i.e., an X % increase in RLC data rate). The value x may correspond to the minimum allowed transport block size or the minimum reference E-TFC or a function thereof, (e.g., a defined fraction of the minimum transport block size). The value x may correspond to the minimum value of the minimum E-TFC set or a function thereof.

Alternatively, the value x may be the minimum value between a percentage of the size of the current E-TFC and a fixed threshold. The percentage and/or the threshold may be pre-defined or signaled by RRC. The threshold may correspond to the minimum RLC PDU size, the smallest RLC PDU size, or any other signaled value. Alternatively, the value x may be the minimum value between 1) the difference in size in bits between the E-TFC that is n indices above the current E-TFC in an E-DCH transport block size table and the current E-TFC, and 2) a fixed threshold. The value of n and/or the threshold may be pre-defined or signaled by RRC. The threshold may correspond to the minimum RLC PDU size, the smallest RLC PDU size, or any other signaled value.

Alternatively, the value x may be set depending whether the minimum improvement of x byte(s) or bits is absolute or relative. For instance, the WTRU may determine that the minimum improvement of x byte(s) or bits is relative if the size of the current E-TFC is below a threshold, if the current E-TFCI is below a threshold, if the current WTRU power headroom (UPH) is below a threshold, or if the current serving grant is below a threshold. The threshold values may be pre-defined or signaled.

In case the minimum improvement of x byte(s) or bits is relative, the value x may be set to a percentage of the size of the current E-TFC, or the difference in bits between the E-TFC that is n indices above the current E-TFC in the E-DCH transport block size table, and the current E-TFC. The value of n may be pre-defined, (e.g., n=1), or signaled.

Conversely, the WTRU may determine that the minimum improvement of x byte(s) or bits is absolute if the size of the current E-TFC is above a threshold, if the current E-TFCI is above a threshold, if the current WTRU power headroom (UPH) is above a threshold, or if the current serving grant is above a threshold. The threshold values may be pre-defined or signaled.

In case the minimum improvement of x byte(s) or bits is absolute, the value of x may be set to a pre-determined or signaled value. The signaled value may be the minimum RLC PDU size, the smallest RLC PDU size, or any other signaled value. Alternatively, the value of x may be the difference in bits between the E-TFC that is n indices above the current E-TFC in the configured E-DCH transport block size table, where the value of n may be predefined, (e.g., n=1), or signaled.

Alternatively, the value x may be the maximum value between a defined threshold and the difference in size in bits between the E-TFC that is n indices above the current E-TFC in the configured E-DCH transport block size table and the current E-TFC. The threshold may be pre-defined or signaled by RRC. The threshold may correspond to the minimum RLC PDU size, the smallest RLC PDU size, or any other signaled value and n may be a predefined value, (i.e., n=1), or signaled.

It should be noted that the method steps in FIG. 3 may be performed in different order. For example, step 306 may be performed before step 302.

Figure 4:
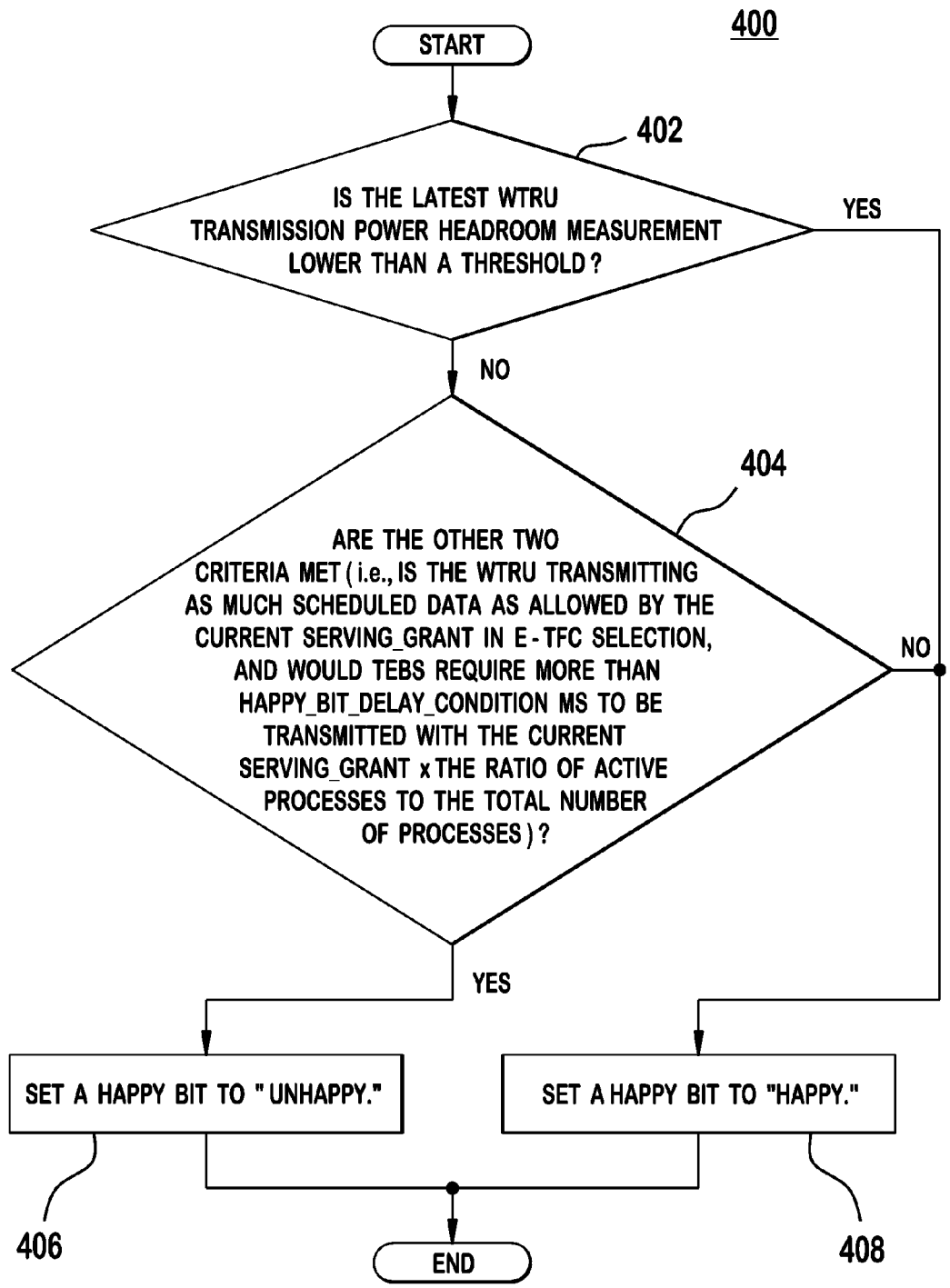
FIG. 4 is a flow diagram of an example process for determining whether a WTRU has enough power available to transmit at a higher data rate and setting a happy bit in accordance with a fourth embodiment.

FIG. 4 is a flow diagram of an example process 400 for determining whether a WTRU has enough power available to transmit at a higher data rate and setting a happy bit in accordance with a fourth embodiment. In case MAC-i/is is configured by a higher layer, a WTRU determines if the latest WTRU transmission power headroom measurement is lower than a threshold (step 402). The WTRU transmission power headroom is the ratio of the maximum WTRU transmission power and the corresponding dedicated physical control channel (DPCCH) code power, which is defined in 3GPP TS 25.215 V8.2.0.

If the latest transmission WTRU power headroom measurement is not below the threshold, the WTRU determines that the WTRU has enough power available to transmit at a higher data rate. The WTRU determines whether the other two criteria, (i.e., criteria (1) and (3)), are met (step 404). If so, the WTRU sets the happy bit to "unhappy" (step 406). If the latest WTRU transmission power headroom measurement is below the threshold, or if the other two criteria are not met, the WTRU sets the happy bit to "happy" (step 408).

The threshold may be pre-determined or signaled by a higher layer. Alternatively, the threshold may be dependent on the granularity of the relative grant (given the parameters 3-index step threshold and 2-index step threshold) at the conventional scheduled grant. Alternatively, the threshold may be a function of the current serving grant. For instance, the threshold may be the sum of the current serving grant (in terms of power ratio) and a factor times the grant increase resulting from a relative grant "UP" command sent from the network.

It should be noted that the method steps in FIG. 4 may be performed in different order. For example, step 404 may be performed before step 402.

Figure 5:
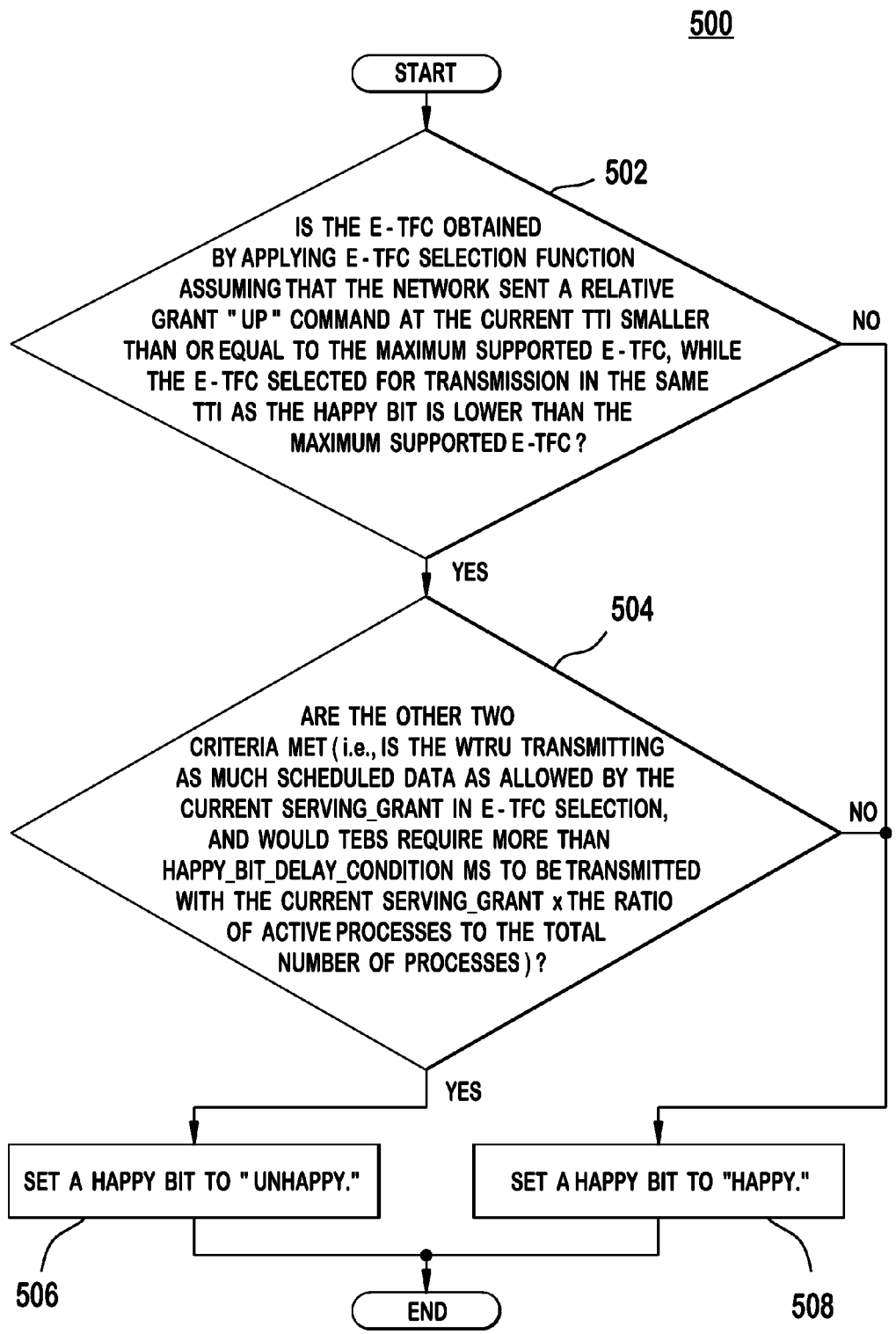
FIG. 5 is a flow diagram of an example process for determining whether a WTRU has enough power available to transmit at a higher data rate and setting a happy bit in accordance with a fifth embodiment.

FIG. 5 is a flow diagram of an example process 500 for determining whether a WTRU has enough power available to transmit at a higher data rate and setting a happy bit in accordance with a fifth embodiment. In case MAC-i/is is configured by a higher layer, a WTRU determines if the E-TFC obtained by applying E-TFC selection function assuming that the network sent a relative grant "UP" command at the current TTI (with the same power offset as the current E-TFC) would be smaller than or equal to the maximum supported E-TFC, while the E-TFC selected for transmission in the same TTI as the happy bit is lower than (or alternatively lower than or equal to) the maximum supported E-TFC (step 502).

If the determination is positive, the WTRU determines that the WTRU has enough power available to transmit at a higher data rate. The WTRU determines whether the other two criteria, (criteria (1) and (3)), are met (step 504). If so, the WTRU sets the happy bit to "unhappy" (step 506). If the determination is negative, or if the other two criteria are not met, the WTRU sets the happy bit to "happy" (step 508).

It should be noted that the method steps in FIG. 5 may be performed in different order. For example, step 504 may be performed before step 502.

In accordance with a sixth embodiment, in case MAC-i/is is configured by a higher layer if a serving grant becomes too small to allow transmission of a single PDU from any scheduled MAC-d flow or if the serving grant is too small to allow transmission of a single PDU from any scheduled MAC-d flow and TEBS becomes larger than zero, the transmission of scheduling information may not be triggered. In case MAC-i/is is not configured by a higher layer, the scheduling information may still be triggered in that situation.

Figure 6:
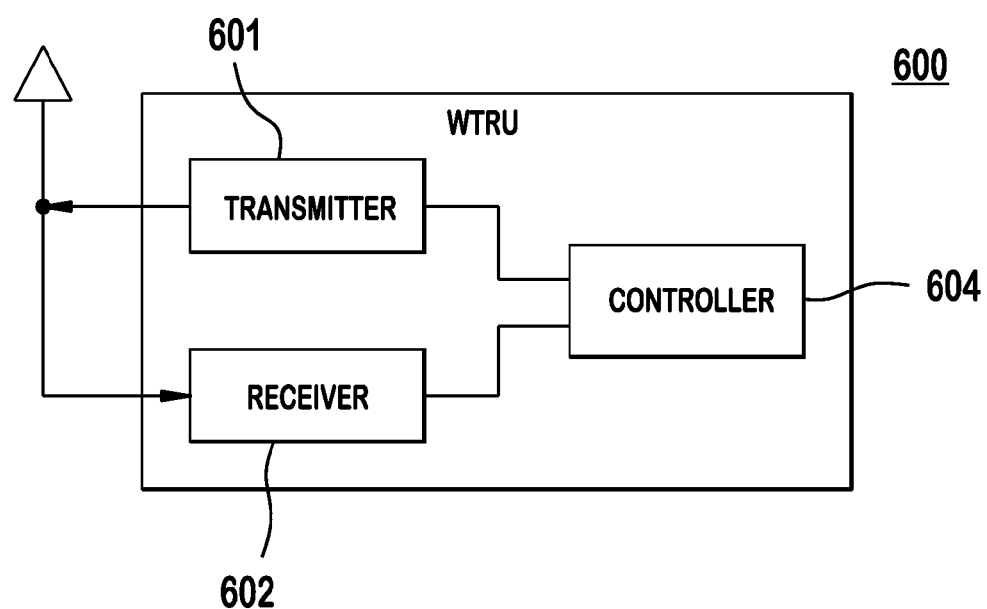
FIG. 6 is a block diagram of an example WTRU.

FIG. 6 is a block diagram of an example WTRU 600. The WTRU 600 includes a transmitter 601, a receiver 602, and a controller 604. The controller 604 is configured to set the happy bit in accordance with any one of embodiments disclosed above. For example, the controller 604 is configured to determine (1) whether the WTRU is transmitting as much scheduled data as allowed by a current Serving_Grant in E-TFC selection, (2) whether the WTRU has enough power available to transmit at a higher data rate, and (3) based on a same power offset as a currently selected E-TFC for transmission in a same TTI as the happy bit, whether TEBS would require more than Happy_Bit_Delay_Condition ms to be transmitted with the current Serving_Grant×a ratio of active processes to a total number of processes, and set the happy bit to "unhappy" if the criteria (1) through (3) are met; otherwise set the happy bit to "happy." The controller 604 is configured to, in order to evaluate the criteria (2), identify an E-TFC that has a transport block size at least x bits larger than a transport block size of the currently selected E-TFC on a condition that a MAC-i/is is configured, and determine whether the identified E-TFC is supported based on a same power offset as the currently selected E-TFC.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit (WTRU) for setting a happy bit on an enhanced dedicated channel (E-DCH) dedicated physical control channel (E-DPCCH), the method comprising:
    determining (1) whether the WTRU is transmitting as much scheduled data as allowed by a current Serving_Grant in E-TFC selection, (2) whether the WTRU has enough power available to transmit at a higher data rate, and (3) based on a same power offset as a currently selected E-DCH transport format combination (E-TFC) for transmission in a same transmission time interval (TTI) as the happy bit, whether total E-DCH buffer status (TEBS) would require more than Happy_Bit_Delay_Condition milliseconds (ms) to be transmitted with the current Serving_Grant.times.a ratio of active processes to a total number of processes; and
    on a condition that the criteria (1) through (3) are met, setting the happy bit to "unhappy", wherein the criteria (2) is evaluated by:
    identifying an E-TFC that has a transport block size at least a variable number (x) bits larger than a transport block size of the currently selected E-TFC on a condition that an improved medium access control entity (MAC i/is) for E-DCH is configured; and
    determining whether the identified E-TFC is supported based on a same power offset as the currently selected E-TFC.

2. The method of claim 1 wherein the value x is a predetermined value.

3. The method of claim 1 wherein the value x is configured by a higher layer.

4. The method of claim 1 wherein the value x corresponds to one of a minimum MAC segment size, a minimum radio link control (RLC) protocol data unit (PDU) size, a percentage increase in a size of a current RLC PDU size, a minimum allowed transport block size, and a minimum value of a minimum E-TFC set.

5. The method of claim 1 wherein the value x is a minimum value between a percentage of a size of the currently selected E-TFC and a fixed threshold.

6. The method of claim 1 wherein the value x is a minimum value between a difference in size in bits between an E-TFC that is n indices above the currently selected E-TFC in an E-DCH transport block size table and the currently selected E-TFC, and a fixed threshold.

7. A wireless transmit/receive unit (WTRU) configured to set a happy bit on an enhanced dedicated channel (E-DCH) dedicated physical control channel (E-DPCCH), the WTRU comprising:
    a transceiver configured to transmit a happy bit on the E-DPCCH; and
    a controller configured to, determine (1) whether the WTRU is transmitting as much scheduled data as allowed by a current Serving_Grant in E-TFC selection, (2) whether the WTRU has enough power available to transmit at a higher data rate, and (3) based on a same power offset as a currently selected E-DCH transport format combination (E-TFC) for transmission in a same transmission time interval (TTI) as the happy bit, whether total E-DCH buffer status (TEBS) would require more than Happy_Bit_Delay_Condition milliseconds (ms) to be transmitted with the current Serving_Grant.times.a ratio of active processes to a total number of processes, and on a condition that the criteria (1) through (3) are met, set the happy bit to "unhappy",
    wherein the controller is configured to, in order to evaluate the criteria (2), identify an E-TFC that has a transport block size at least a variable number (x) bits larger than a transport block size of the currently selected E-TFC on a condition that an improved medium access control entity (MAC i/is) for E-DCH is configured, and determine whether the identified E-TFC is supported based on a same power offset as the currently selected E-TFC.

8. The WTRU of claim 7 wherein the value x is a predetermined value.

9. The WTRU of claim 7 wherein the value x is configured by a higher layer.

10. The WTRU of claim 7 wherein the value x corresponds to one of a minimum MAC segment size, a minimum radio link control (RLC) protocol data unit (PDU) size, a percentage increase in a size of a current RLC PDU size, a minimum allowed transport block size, and a minimum value of a minimum E-TFC set.

11. The WTRU of claim 7 wherein the value x is a minimum value between a percentage of a size of the currently selected E-TFC and a fixed threshold.

12. The WTRU of claim 7 wherein the value x is a minimum value between a difference in size in bits between an E-TFC that is n indices above the currently selected E-TFC in an E-DCH transport block size table and the currently selected E-TFC, and a fixed threshold.

* * * * *